UNITED STATES PATENT OFFICE.

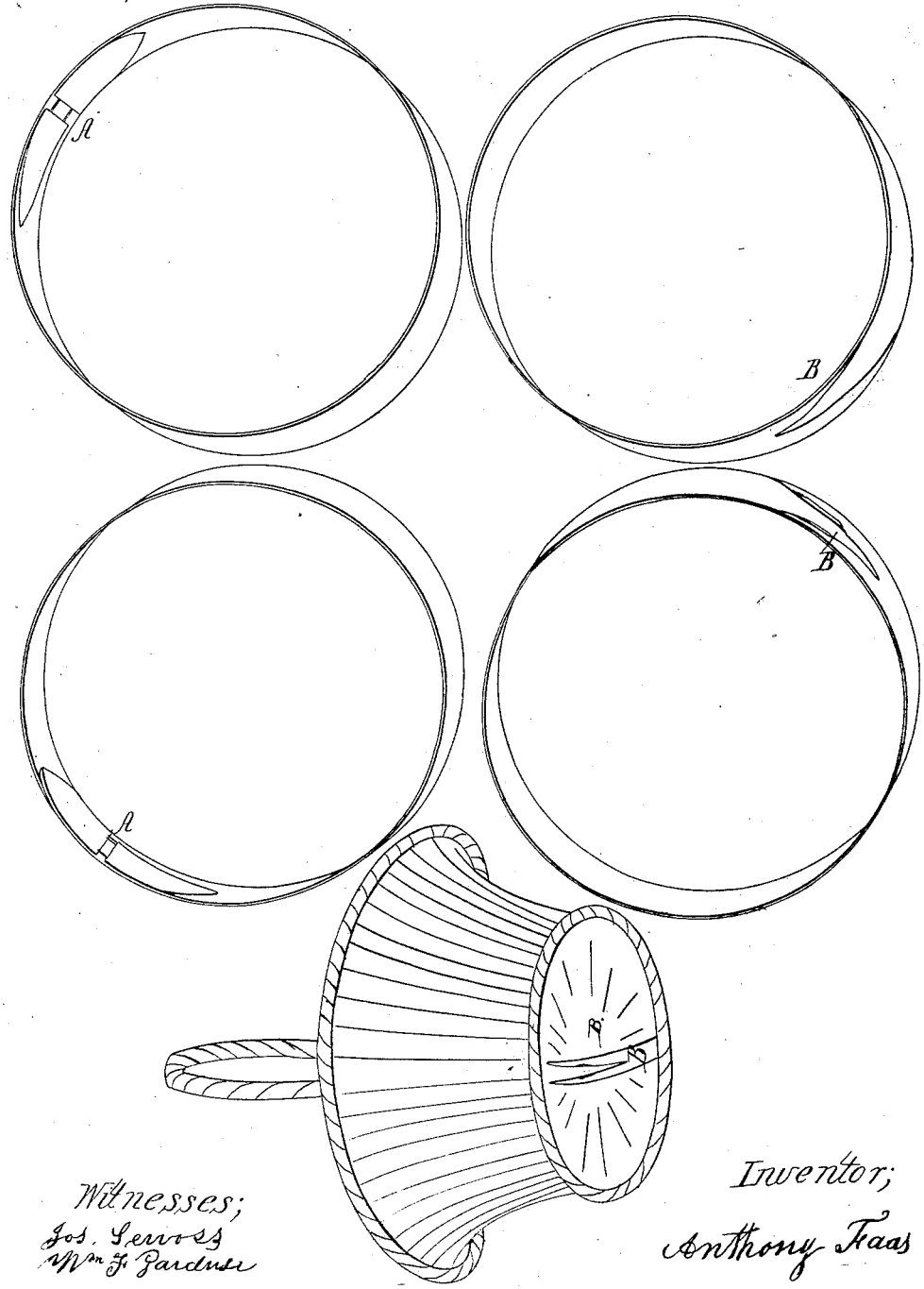

ANTHONY FAAS, OF PHILADELPHIA, PENNSYLVANIA.

IMPROVEMENT IN FASTENING HANDLES TO BASKETS.

Specification forming part of Letters Patent No. 17,621, dated June 23, 1857.

*To all whom it may concern:*

Be it known that I, ANTHONY FAAS, of Philadelphia, in the county of Philadelphia, in the State of Pennsylvania, have invented a new and Improved Mode of Preventing Basket-Handles from Coming Out; and I do hereby declare that the following is a full and exact description thereof, reference being had to the accompanying drawing, and to the letters of reference marked thereon.

The nature of my invention consists of a basket-handle forming a hoop at the bottom of one piece joined together by a lock, as shown at B in the accompanying drawing. By this improvement it secures the handle and bottom permanently. When the basket is finished, the inside of the lock cannot be seen; but the view is given of the inside of the lock at A, as is shown in the accompanying drawing.

I first make a hoop out of hickory or any other strong wood that will give or bend. I then cut a slit at one end of the hoop, and at the end of the slit I cut a small square hole with notch or catch. On the inside it is cut out hollow. At the end of the square it is raised a little above the level of the hoop, so as, when joined by the other end of the hoop, it makes a complete lock. On the outside it is cut out hollow near to the end of the hoop. The other end of the hoop is cut similar to the lower part of an anchor, which, when joined to the other end of the hoop, makes a permanent fastening. As soon as the basket is made independent of the handle, I insert my improved handle down each side of the basket, extending it to the bottom. I then join both ends together, as described, which prevents the handle of the basket from coming out, and also secures the bottom.

What I claim as my invention, and desire to secure by Letters Patent, is—

An improvement in basket-handles, as above described.

ANTHONY FAAS.

Witnesses:
    JOHN APPLE,
    JOSEPH SERVOSS.